(12) United States Patent
Voltz

(10) Patent No.: US 6,314,523 B1
(45) Date of Patent: *Nov. 6, 2001

(54) APPARATUS FOR DISTRIBUTING POWER TO A SYSTEM OF INDEPENDENTLY POWERED DEVICES

(75) Inventor: Christopher Voltz, Houston, TX (US)

(73) Assignee: Compaq Computer Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/835,628

(22) Filed: Apr. 9, 1997

(51) Int. Cl.[7] .............................. G06F 1/26; G06F 1/28; G06F 1/30
(52) U.S. Cl. .................... 713/324; 713/300; 713/310; 713/320; 713/322; 713/323; 360/75; 330/265; 307/64
(58) Field of Search .................... 395/750.03, 750.02, 395/750.05, 750.06; 364/707; 713/300, 310, 320, 322, 324, 321, 323; 330/265; 307/64; 360/75

(56) References Cited

U.S. PATENT DOCUMENTS

| | | | | |
|---|---|---|---|---|
| 4,747,041 | * | 5/1988 | Engel et al. ..................... 395/750.6 |
| 4,980,836 | | 12/1990 | Carter et al. ..................... 364/483 |
| 5,167,024 | * | 11/1992 | Smith et al. ..................... 395/375 |
| 5,182,810 | | 1/1993 | Bartling et al. ..................... 395/750 |
| 5,283,819 | * | 2/1994 | Glick et al. ..................... 379/90 |
| 5,339,445 | * | 8/1994 | Gasztonyi ..................... 713/300 |
| 5,390,350 | * | 2/1995 | Chung et al. ..................... 395/150 |
| 5,408,668 | * | 4/1995 | Tornai ..................... 713/324 |
| 5,410,274 | * | 4/1995 | Birdsall et al. ..................... 330/265 |
| 5,410,711 | * | 4/1995 | Stewart ..................... 395/300 |
| 5,534,791 | * | 7/1996 | Mattos et al. ..................... 326/27 |
| 5,546,591 | * | 8/1996 | Wurzburg et al. ..................... 713/300 |
| 5,579,524 | * | 11/1996 | Kikinis ..................... 395/750 |
| 5,585,745 | * | 12/1996 | Simmons et al. ..................... 326/93 |
| 5,603,040 | * | 2/1997 | Frager et al. ..................... 713/300 |
| 5,610,791 | * | 3/1997 | Voldman ..................... 361/56 |
| 5,617,571 | | 4/1997 | Tanaka ..................... 395/750 |
| 5,625,807 | * | 4/1997 | Lee et al. ..................... 395/560 |
| 5,644,255 | * | 7/1997 | Taylor ..................... 326/81 |
| 5,671,131 | * | 9/1997 | Brown ..................... 363/56 |
| 5,675,808 | * | 10/1997 | Gulick et al. ..................... 713/324 |
| 5,675,813 | * | 10/1997 | Holmdahl ..................... 395/750.2 |
| 5,708,817 | * | 1/1998 | Ng et al. ..................... 710/266 |
| 5,721,933 | * | 2/1998 | Walsh et al. ..................... 395/750 |
| 5,786,630 | * | 7/1998 | Bhansali et al. ..................... 257/697 |
| 5,815,706 | * | 9/1998 | Stewart et al. ..................... 395/652 |
| 5,818,299 | * | 10/1998 | Tran ..................... 330/149 |
| 5,831,346 | * | 11/1998 | Baumann et al. ..................... 307/64 |
| 5,870,616 | * | 2/1999 | Loper et al. ..................... 713/323 |
| 5,872,737 | * | 2/1999 | Tsuruda et al. ..................... 365/189.05 |

FOREIGN PATENT DOCUMENTS 0 565 914A  10/1993  (EP) .
08 016285A   1/1996  (JP) .

* cited by examiner

Primary Examiner—Ayaz Sheikh
Assistant Examiner—Frantz Jean
(74) Attorney, Agent, or Firm—Sharp, Comfort & Merrett, P.C.

(57) ABSTRACT

According to the present invention, an apparatus having a plurality of independently operable and powerable devices is disclosed. The apparatus includes a plurality of power rails, a plurality of ground planes, and a power management circuit. One of the power rails is associated with one of the plurality of independently operable devices. One of the plurality of ground planes is selectively associated with one or more of the plurality of power rails. The power management circuit couples to the plurality of power rails and the second plurality of ground planes, for selectively deactivating at least one of the plurality of ground planes independently of any of the other plurality of power rails.

27 Claims, 5 Drawing Sheets

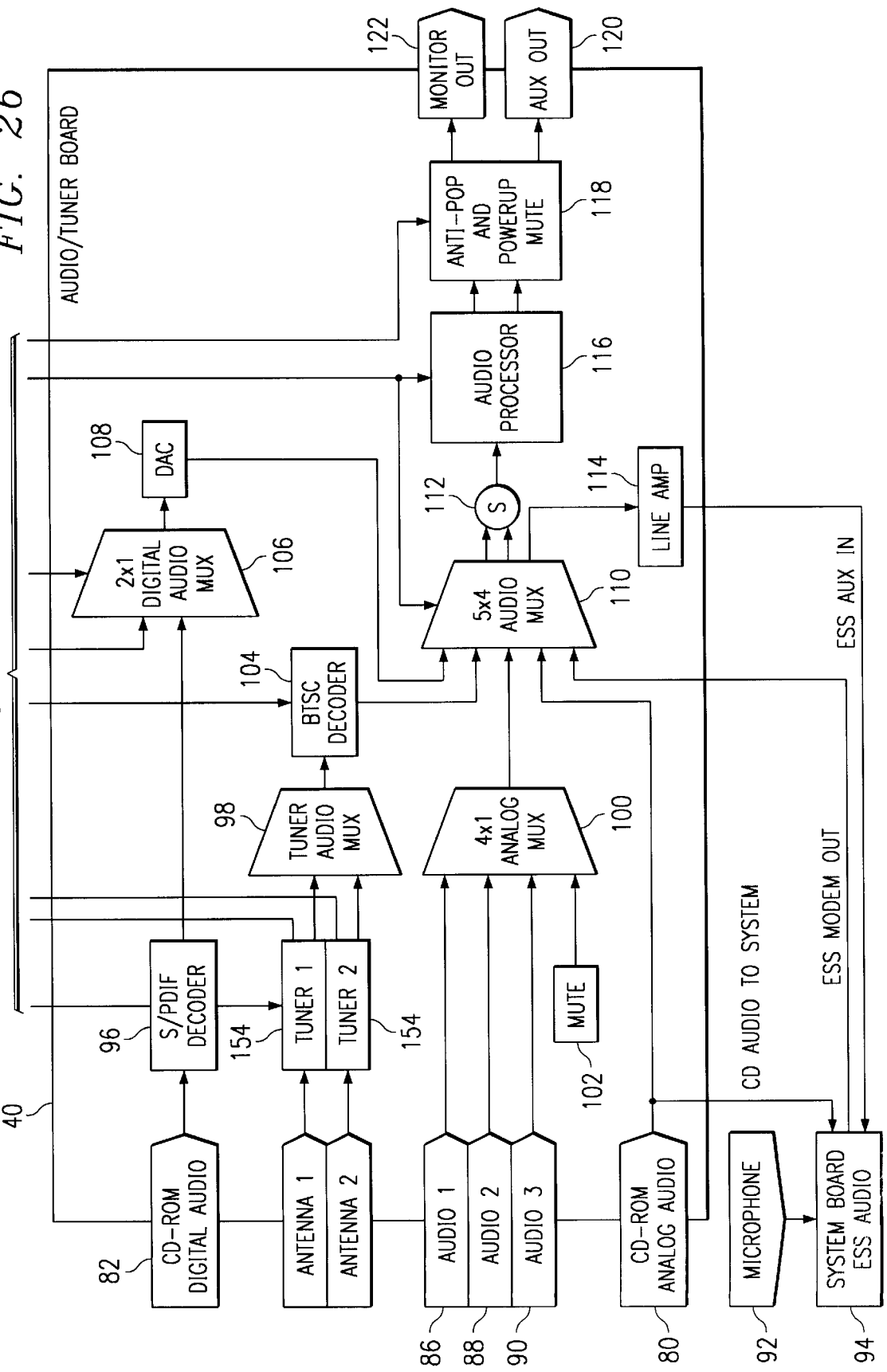

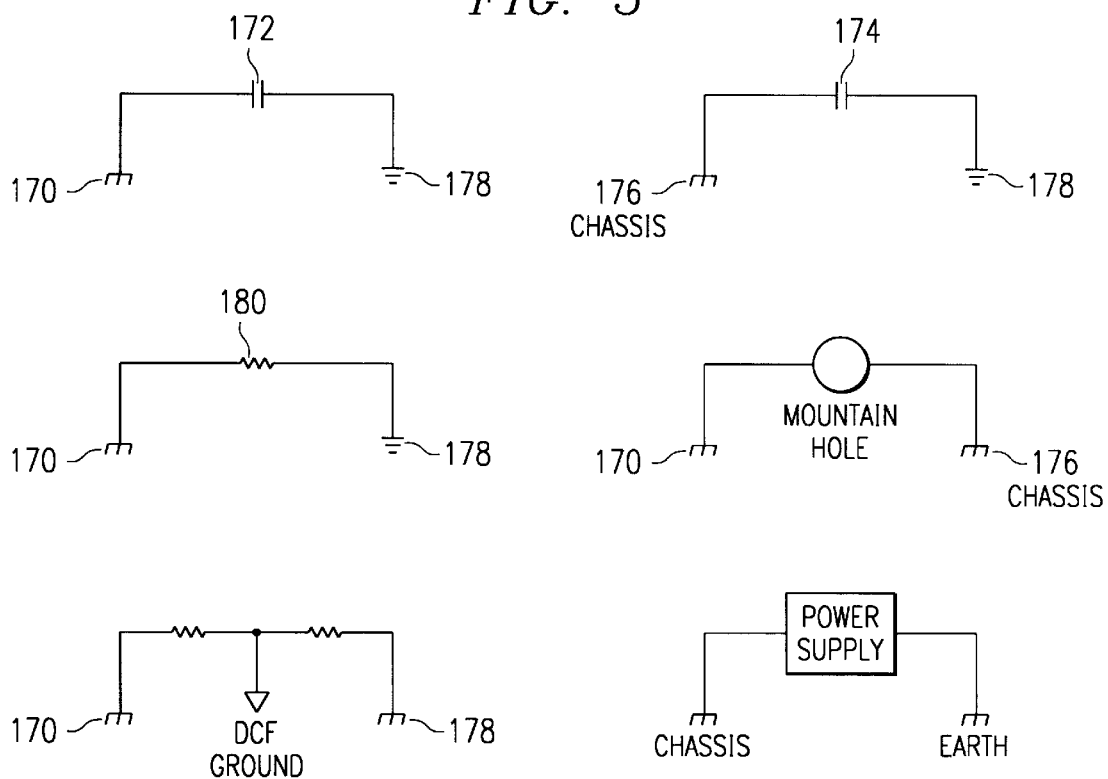

APPARATUS FOR DISTRIBUTING POWER TO A SYSTEM OF INDEPENDENTLY POWERED DEVICES

RELATED APPLICATION

The application is related to application Ser. No. 08/829,437, filed on Mar. 28, 1997, entitled "POWER MANAGEMENT SCHEME FOR APPARATUS WITH CONVERGED FUNCTIONALITY," incorporated by reference herein.

PRIORITY FILING DATE

Priority filing date for the present application is claimed under Provisional Application, Ser. No. 60041810, filed Apr. 8, 2000, 1997, titled "APPARATUS FOR MANAGING POWER CONSUMPTION WITHIN A SYSTEM WITH INDEPENDENTLY POWERED DEVICES."

BACKGROUND OF THE INVENTION

1. The Field of the Invention

The present invention relates generally to power management devices within a powered system. More particularly still, the present invention relates to managing the power requirements of a system having a plurality of independently powered and operable devices integrated in a single system.

2. Prior Art

Power conservation in consumer appliances has come a long way from the early days of simply turning the appliance off. Simple timing devices were added to the appliance to turn it on at a select time and then turn it off at another select time in one attempt to conserve energy, while providing the consumer with some added flexibility. Another way of determining when it was appropriate to power an apparatus off was to monitor the level of activity for that appliance. When the level of inactivity for the appliance reached a certain level, the system would go into a sleep mode and power down entirely. Either the appliance had to be manually turned on again, or the sleep mode could be ended, but in any event the information of activity at the time of suspension would be lost and the system would start over.

Next, appliances became integrated so that the operation of the main unit would control the individual devices. This was helpful where commonality was desired. For example, audio components have become integrated such that the amplifier portion, the tuner portion, the tape playback portion, and the CD drive portion all share the same power source and can be selectively turned on and off by the user while the main system is still powered on. For example, the user may be listening to the tuner and have turned off the tape player and the CD player. These type of components, however, require that the user actively turn off the device rather than the device turning off automatically upon lack of use. Further, in these component systems, the subsystems typically do not function or operate should the main unit be powered down.

In another consumer appliance area, the computer industry, energy conservation is an important feature in many peripheral devices and main systems. For example, many monitors are now Energy Star compliant such that they turn off after a given period of inactivity. This conserves energy and if the device is a video monitor, it lessens the exposure of the user to the magnetic field generated. Likewise, many printers are now Energy Star compliant in that they power down after a preselected level of inactivity when no print operations have been requested. Even before Energy Star standards had been established and agreed upon, hard disk drives would power down after a certain level of inactivity as would floppy disk drives and CD drives. During all this inactivity, however, the main system would stay active and online at full power regardless of the status of the peripheral devices connected to the main system.

Laptop computers, typically with their great need to conserve energy because of limited battery life, have optimized the art of powering down specific components within the system. Again, screens have been powered down, as have hard disk drives, as have other peripheral devices that typically drain power with constant steady use. But these power management improvements are still lacking in that if the main system needs to be powered down, then the entire system is nonfunctional.

Accordingly, what is needed is an improved way of managing power to different components within a consumer appliance even if the main powered element is to be shut down due to inactivity.

SUMMARY OF THE INVENTION

According to the present invention, an apparatus having a plurality of independently-operable and powerable devices is disclosed. The apparatus includes a plurality of power rails, a second plurality of ground planes, and a power management circuit. One of the power rails is associated with one of the plurality of independently operable devices. One of the plurality of ground planes is selectively associated with one or more of the plurality of power rails. The power management circuit couples to the plurality of power rails and the second plurality of ground planes, for selectively deactivating at least one of the plurality of power rails independently of any of the other plurality of power rails.

The independently operable devices are selected from a group of analog signal processing devices, digital signal processing devices, as well audio analog and video analog processing devices. Further, these independently operable devices typically operate at different voltage levels, while some devices share the same voltage level for operation and can share the same ground plane, others cannot share the same ground plane or voltage requirements.

The specific apparatus includes a circuit for providing selective power engagement and disablement for these plurality of integrated devices. This particular circuit includes a power source for each of the plurality of integrated devices. This power source is the main power supply that is subdivided into various power sources for operating each of the integrated devices where some of these power devices actually share the same power supply. Switching circuitry is provided that is coupled to each of the plurality of integrated devices. The switching circuitry, upon activation, engages or disengages the power source to the particular integrated device so designed to facilitate the ability to separately select which integrated device is to be powered off, isolation ground planes are provided for each of the integrated devices. Some of these devices may share the same ground plane, while others may have independent and isolated ground planes as needed. The switching circuitry further includes a first and second activator switch, which are arranged in the fashion of a single pole/double throw switch. A control switch is further included that is coupled to the power supply and to each of the first and second activator switches. The control switch enables both the first and second switch to engage, thus enabling or disabling the power supply upon activation by the control switch.

Lastly, a method is provided for discretely powering the integrated devices. In this method, the system associates a selected power source to the plurality of integrated devices. Again, the power source may be one or multiple sources for each of the integrated devices as desired. Next, the system associates each of the integrated devices to a preselected ground plane. The system then switches one of the plurality of integrated devices between a power-on and a power-off state independently of any of the other plurality of integrated devices, provided that integrated device is tied to a separate power supply.

BRIEF DESCRIPTION OF THE DRAWINGS

FIG. 5 illustrates in schematic diagrams the ground planes used in the present invention.

DETAILED DESCRIPTION OF THE SPECIFIC EMBODIMENTS

Figure 1:
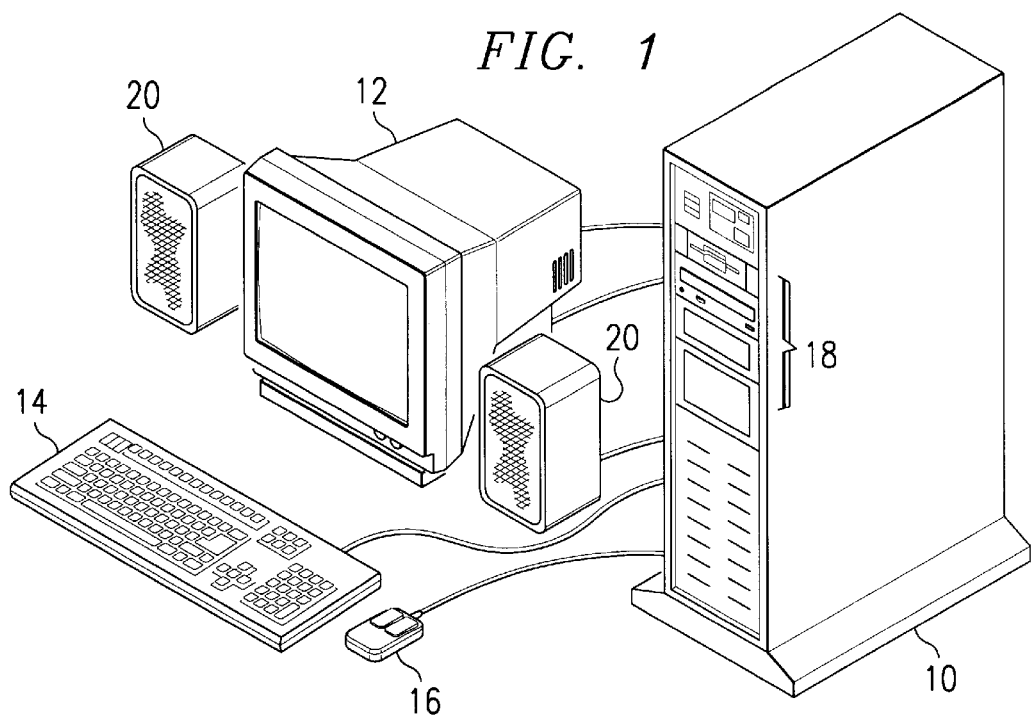
FIG. 1 is a multimedia computer system that incorporates the power management apparatus according to the present invention.

Illustrated now in FIG. 1 is a computer system 10 according to the present invention. Computer 10 includes multimedia features and devices and includes a video monitor display 12, a keyboard 14, a pointing device such as mouse 16, disk storage means 18, and audio speakers 20. Disk storage means 18 may any type of disk storage technology such as a floppy disk drive, a hard disk drive, or compact disc readable memory drive, or other type writeable or erasable storage devices typically known to those skilled in the art. Keyboard 14 provides data input for the user, as does pointing device 16. Additionally, video display 12 is typically a progressive scan, multi-sync monitor, but may also be able to display interlaced scanned imaging.

Within computer 10 there are other various devices for operation. These devices include a central processing unit, such as those typically provided by the Intel Corporation, such as the Pentium microprocessor, or the PowerPC microprocessor manufactured by IBM that is available for personal computing systems. It is intended that the microprocessor used within computer 10 be of such a design that it is not specifically limited to any of these types of microprocessor systems, but rather can be applied to any type of microprocessor processing system typically used in a personal computing system. Additionally, short-term memory that is operating at the same operating speed as the CPU, typically known as "cache memory," can be included. Random access memory (RAM) is also included for holding information and is responsive in a speed not as fast as the CPU or the cache, but much faster than the transfer rate of the hard disk storage device or any other long-term storage device provided in the computer 10. Additional control elements and peripheral devices are incorporated in the computer, and the fundamental construction of the desktop computer does not diverge substantially from those typically well-known to those skilled in the art. Likewise, rather than a desktop computer system as depicted in FIG. 1, computer 10 may be a laptop or other portable computer systems that have their components miniaturized for convenience in bulk and weight and transportability.

A system bus is typically provided that connects the central processing unit to the various other devices, such as keyboard 14, display monitor 12, pointing device 16 and disk storage means 18. A typical bus system is the Peripheral Component Interconnect (PCI) standard bus implemented commonly in many computer systems, but other bus systems are possible, including EISA, ISA, and MicroChannel, as well as a local bus design.

Further connected to the bus are a video/graphics unit 30 for processing video information for output to display monitor 12 and an audio/tuner unit 40 for separating the audio portion of some multimedia signals input to computer system 10 for processing for output through speakers 20.

Figure 2A:
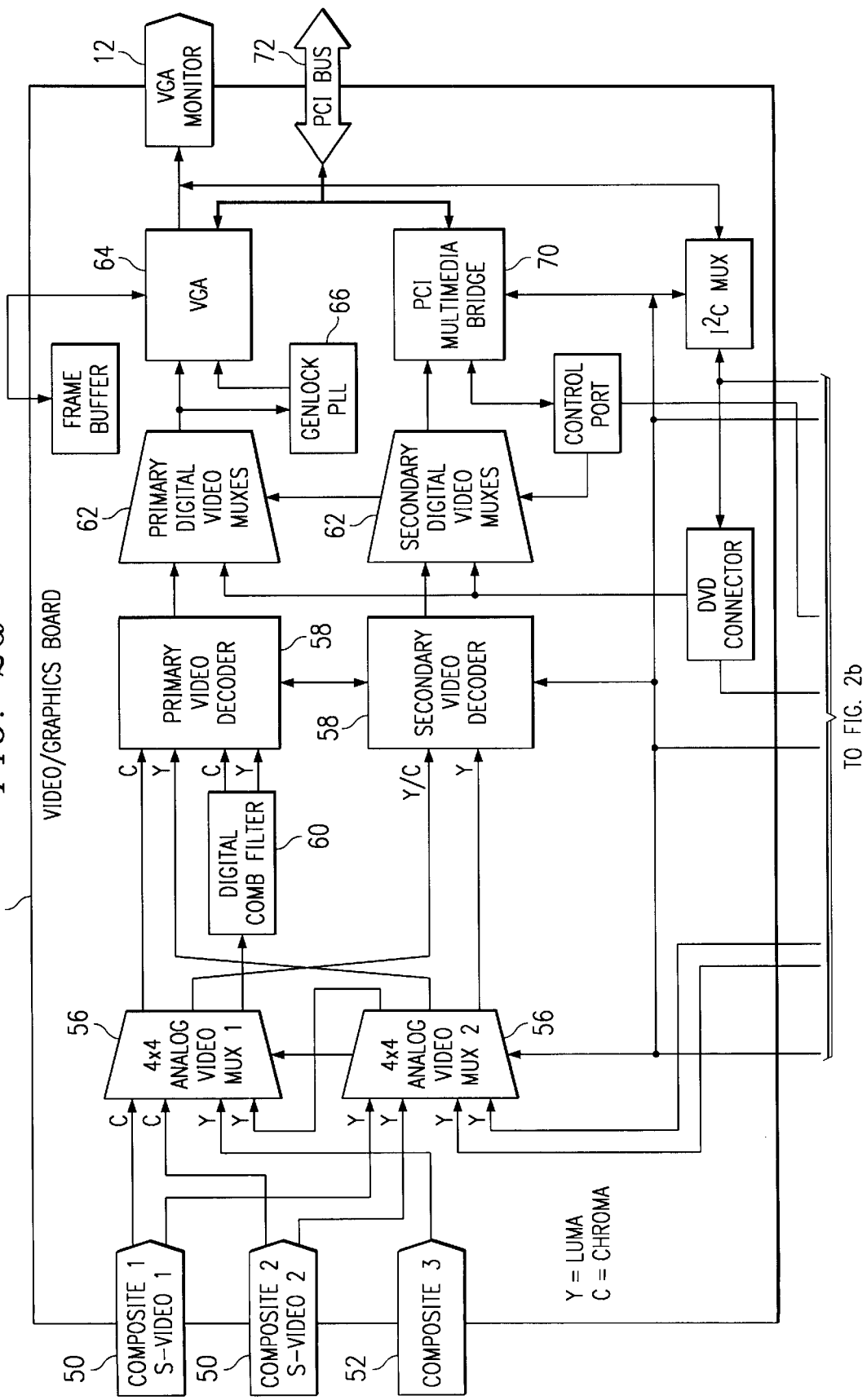
FIG. 2 is a block diagram of additional independently powered devices within the computer system of FIG. 1.

The video/graphics unit 30 is further depicted in block diagram form in FIG. 2, as is audio/tuner unit 40. Video/graphics unit 30 can accept multiple video input sources such as S-video and composite video. These are input through S-video/composite connectors 50 and composite input connector 52. Additional input sources are provided from the audio/tuner board 40 through tuners 54, which provide RF tuning capability. The video input sources typically are analog signals that can be selected from System-M (NTSC), or any other type analog standard. Connectors 50, 52 and tuners 54 direct the signal to a first and second video multiplexers 56. When an S-video signal is sent to multiplexer 56, it is separated into two different components. There is a Y component and a C component. The Y component includes the luminance and synchronization necessary for the video signal, while the C component carries the chrominance portion of the video signal. If the signal is in the form of a composite video signal, then the luminance, chrominance, and synchronization are all included in a composite signal and also will be labeled under the Y component. Since connectors 50 are universal in nature, meaning that they can accept either the composite video signal or an S-video source, the connection for the chrominance component is forwarded to the first video multiplexer 56, while the luminance component is forwarded to the second video multiplexer 56. Likewise, the composite signals from antenna connectors 54 are directed to the second video multiplexer 56.

Video multiplexers 56 are programmable so as to provide any combination of video signal output desired by the designer. A typical programming sequence for providing various combinations of signal output from different sources is depicted in Table 1. This illustrates how the primary video source is selected by the programmability of multiplexers 56. Likewise, the secondary video source selection is selected by the programmability of multiplexers 56.

| Primary Video   | Video Mux 1 |        | Video Mux 2 |        |               |
|-----------------|-------------|--------|-------------|--------|---------------|
| Source Selection | Input      | Output | Input       | Output | Video Decoder |
| Composite 1     | 3           | 0      | 2           | 0      | S-Video 1     |
| Composite 2     | 3           | 0      | 3           | 0      | S-Video 1     |
| Composite 3     | 2           | 0      | —           | —      | S-Video 1     |
| S-Video 1       | 0           | 1      | 2           | 1      | S-Video 1     |
| S-Video 2       | 1           | 1      | 3           | 1      | S-Video 1     |
| Tuner 1         | 3           | 0      | 0           | 0      | S-Video 1     |
| Tuner 2         | 3           | 0      | 1           | 0      | S-Video 1     |

| Secondary Video | Video Mux 1 | | Video Mux 2 | | |
|---|---|---|---|---|---|
| Source Selection | Input | Output | Input | Output | Video Decoder |
| Composite 1 | — | — | 2 | 2 | Composite 2 |
| Composite 2 | — | — | 3 | 2 | Composite 2 |
| Composite 3 | 2 | 3 | — | — | Composite 4 |
| S-Video 1 | 0 | 2 | 2 | 3 | S-Video 2 |
| S-Video 2 | 1 | 2 | 3 | 3 | S-Video 2 |
| Tuner 1 | — | — | 0 | 2 | Composite 2 |
| Tuner 2 | — | — | 1 | 2 | Composite 2 |

A simple video multiplexer has been provided before, but no video multiplexer system has been provided that has been able to receive and manage multiple input sources and output multiple input sources in the various combinations desired by the user or the designer. These combinations including, but limited to a single video source being delivered to multiple video streams. Accordingly, this video/graphics unit 30 incorporates two programmable four-by-four video multiplexers 56, which can be obtained from Philips Corporation, Model No. TDA8540T. Parallel video streams or paths are provided to receive the signals from the first video multiplexer 56 and the second video multiplexer 56. Further, rather than use a large, single multiplexer, the multiple multiplexer design described herein allows great flexibility of programmability as each multiplexer can be independently programmed.

For composite video connector 52, the composite signal is sent to the first video multiplexer 56, which is then sent to video decoder 58 as composite or to digital comb filter 60, which separates the Y component from the C component of the signal and forwards the Y and C components to video decoder 58. Video decoder 58 is a Philips Corporation video decoder, Model No. SAA7111, type-decoder, but comparable equivalents can be selected instead and the invention is not so limited to one specific type of part.

The second video multiplexer 56 forwards its Y component either back to first video multiplexer 56 or to the first video decoder 58 or to the second video decoder 58.

The digital comb filter 60 then feeds the video signal, which has since been divided into an S-video type signal, to the first video decoder 58. Again, two paths are possible in that the first video decoder 58 sends the decoded video signal to a first digital multiplexer 62, while the second video decoder 58 sends the decoded video signal to a second video multiplexer 62. Yet a third input source is possible at this time in that a digital video source may be input into either the first digital video multiplexer or the second digital video multiplexer 62. This connector is a digital multimedia connector 64 and also feeds an audio portion to the audio/tuner device 40. Typical digital video signals are MPEG encoded signals from sources such as Digital Versatile Disk (DVD) and Digital Broadcast System (DBS).

The first digital video multiplexer 62 then selects the signal to provide the actual decoded video signal to be handled by a graphics controller 64 with timing information being sent to a phase lock loop (PLL) circuit, further connected to the graphics controller 64. The decoded signal from the second digital video decoder 58 is then multiplexed through the second digital video multiplexer 62 being selected from the decoded signal from video decoder 58 or from digital multimedia connector 68. This signal from the second digital video multiplexer 62 then proceeds to a secondary video processor 70. Video processor 70 performs additional video functions such as video scaling and also provides for a bus interface with the PCI bus 72 that interconnects the computer components one to another, as well as interconnects the secondary video processor 70 with the primary video graphics controller 64. Then the final signal is output through primary video graphics controller 64 to monitor 12.

The interconnection between multiplexers 56, video decoders 58, video controller 64, and video processor 70 are all accomplished over an IIC bus, which is an "inter-integrated circuit" bus and is also known as an $I^2C$ bus.

With multiple input and output sources now incorporated in the computer system, impedance problems now occur that didn't previously occur. For example, where a single video source is output to multiple video streams, the single video signal needs to be boosted, or buffered in order to support multiple video streams without undue degradation caused by the impedance change. Accordingly, multiplexers 56 include a buffer to allow the multiplexing of a single video signal to multiple video paths without such signal degradation. Signal isolation to the circuit is further provided to prevent each output and input connector from interfering with any of the others at all times.

Computer system 10 further incorporates audio/tuner board 40, which is also shown in greater detail in FIG. 2, and can accept and process various audio input sources. These input sources include a CD-ROM analog audio connector 80, a CD-ROM digital audio connector 82, the audio portion of the video signal received on either of tuners 54, three distinct audio connectors 86, 88 and 90, a microphone input 92, a PC game audio chip on the motherboard, and digital audio from the multimedia connector 68.

The audio signal from digital audio input 82 then feeds to decoder 96, which converts the Sony/Philips Digital Interface Format (S/PDIF) format audio to inter-integrated circuit sound (IIS) digital audio, also known as $I^2S$. Meanwhile, the audio portions of the multimedia signals received on either first tuner or second tuner 54 are then sent to a composite audio multiplexer 98 for selecting which one is active. The audio inputs 86, 88, and 90 feed into a four input analog multiplexer 100, which also includes a mute 102 input. The selected signal from multiplexer 98 then proceeds to stereo decoder 104. The signal from decoder 96 then feeds to digital audio switch 106, which also receives the IIS digital audio signal from multimedia connector 68. The signal selected then proceeds through a digital-to-analog converter 108 and then is fed to an audio switch 110, which also receives the output signal from stereo decoder 104, analog audio input 80, from analog multiplexer 100, and from the PC game audio chip 94 on the motherboard.

Audio switch 110 sends multiple signals that can be added through summing device 112 before proceeding to audio processor 116. A third output from audio switch 110 proceeds back to the motherboard through line amplifier 114. Once the input signal is processed through audio processor 116, it then proceeds to the power up and mute stage 118 before going out to the auxiliary output 120 and the signal output 122. The signal output 122 can feed to a power amplifier within a monitor system that has speakers either built-in or attached to the sides.

Figure 3:
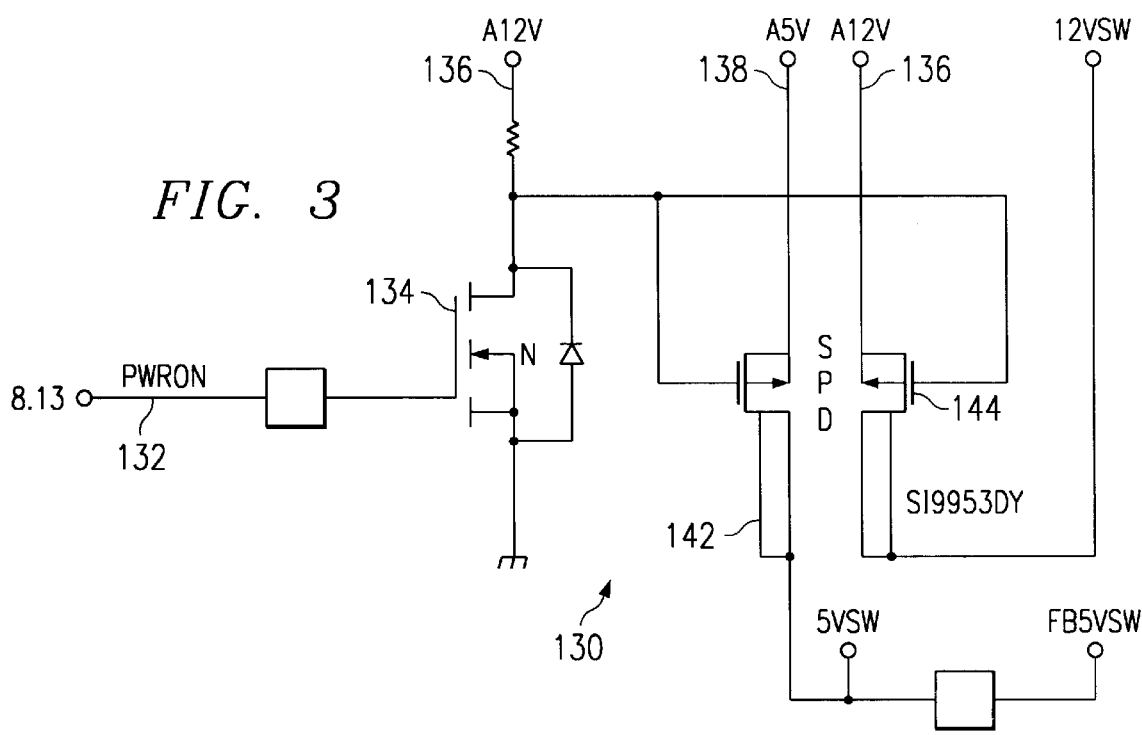
FIG. 3 depicts in schematic form the power management device used with the devices of FIG. 2.

Although a detailed audio/tuner circuit 40 has been described, any type of audio/tuner circuit may be possible. Since the audio tuner is part of the multimedia system within computer 10, it too requires being powered in the system just as the video card 30 requires being powered. What is provided to control the power sources among the various components in this computer system is a power manager 130 shown in FIG. 3. In this embodiment, power manager 130 includes an input line 132 that activates switch 134, which is a transistor in this embodiment, for controlling a 12V power source for the computer system 10. Power manager 130 uses two analog switches 142, 144. The control inputs of both switches 142, 144 are connected together to look like a single pole, double throw switch (SPDT). Switch 134 inverts the control line and generates the required 12V gate voltage on power manager 130.

Power manager 130 further includes two additional voltage sources, a 5V signal 138 and a second 12V signal input 140. Both are activated via a switch where 5V signal 138 is activated by switch 142 and the 12V signal 140 is activated by switch 144. Both the gates of signals 138 and 140 are controlled by the voltage from the first voltage source 136 as controlled by the first switch 134.

As there are various types of voltage requirements within computer system 10, there are several different types of voltage regulators that are provided within the system. It is the power management's job to control these particular voltage regulators for when a particular component within computer system 10 is to be powered down. Power manager 130 is constructed in this embodiment so as to be able to power down the entire audio/video system 30/40 independently of the rest of computer system 10. In this embodiment, the CPU is always on when displaying graphics, or video, or both but this is not required by this invention and does not limit it. Different regulators are provided to separate the power for the analog video, analog audio, and the digital devices. Since the computer system 10 mixes analog and digital components, their voltage flavor, or voltage requirements, are typically divergent in such a manner that even different grounding schemes are required to minimize noise on the power rails.

Figure 4A:
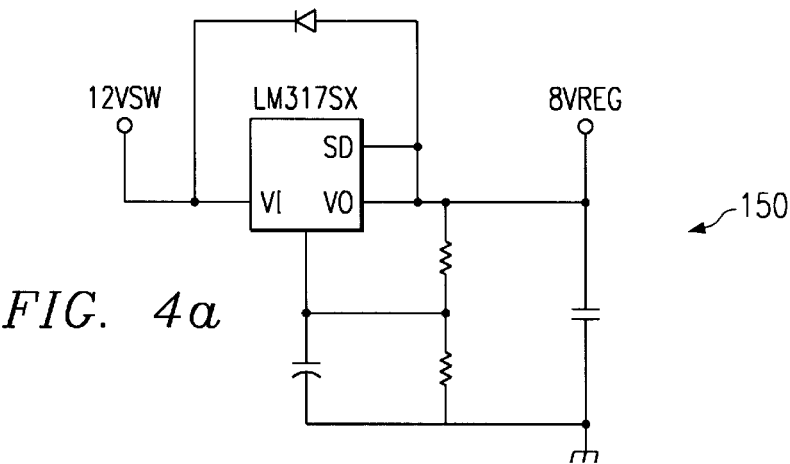
FIG. 4 depicts in schematic diagrams, the power regulators associated with the devices of FIG. 2.
Figure 4B:
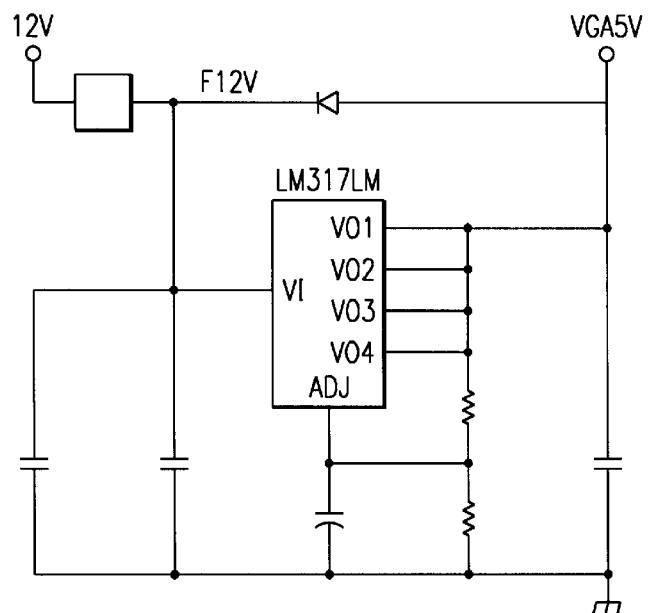
Figure 4C:
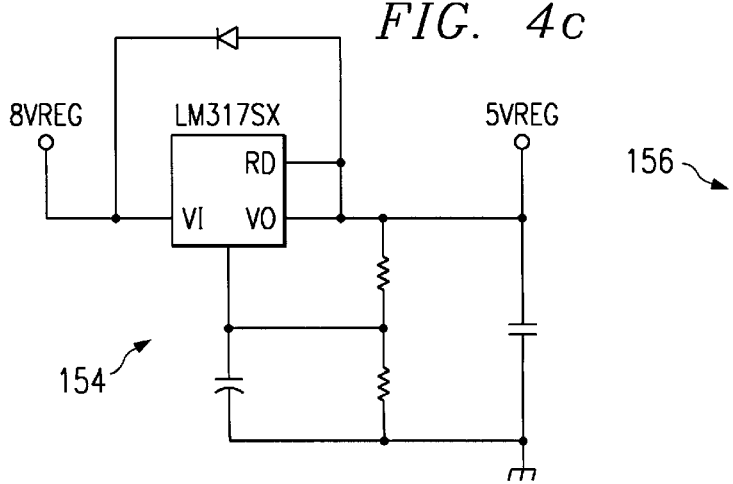
Figure 4D:
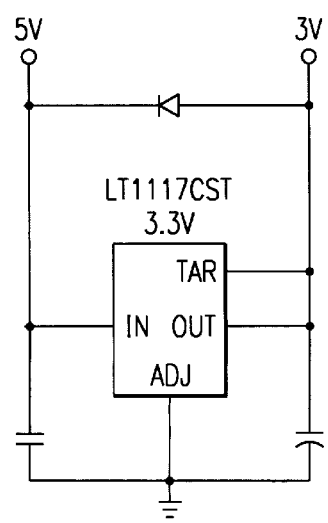

In order to accomplish regulation of the power system to the various components, and be able to control whether the power is on or off to the selected components, the voltage regulators are provided and different grounding paths are provided for each component as necessary. Within the system is an 8.5V regulator 150 which is shown in FIG. 4a. A 5V regulator 152 for the VGA signal processor is shown in FIG. 4b, while a 5V regulator 154 for the video decoders is shown in FIG. 4c. Lastly, a 3.3V regulator 156 for the secondary video processor is illustrated in FIG. 4d.

The grounding paths for the different components within computer system 10 are depicted in FIG. 5. FIG. 5 is a schematic diagram of the connections between the analog ground planes, the digital ground plane, and the chassis ground plane. The full complement of ground planes includes: digital ground, digital comb filter ground, VGA ground, analog ground, and chassis ground, and earth ground. All grounds connect to the chassis ground at some frequency. The digital ground 178 connects via capacitor 174 to chassis ground 176 in two places. The digital ground 178 is connected to analog ground 170 via resistor 180 in one place. The VGA ground and analog ground 170 are connected together in one place on the board 30. The combined VGA and analog ground 170 are connected to the chassis ground via mechanical connections in the connectors and via two mounting holes. The digital comb filter 60's ground plane is connected via a resistor to both analog ground 170 and digital ground 178. The chassis ground is connected to the earth ground inside the power supply of the computer 10.

What this provides is a separate partition between the analog the digital components within computer system 10.

Further, it is anticipated that alternative embodiments of power manager 130 would include allowing the entire TV path to be turned off independently of the audio path. Meanwhile, other computer component paths can also be turned off while leaving on the TV path and the audio path. Prior systems have been able to turn off various components, but have required that the main computer system always be powered, nor have they been able to control precisely, which components are to be powered down in the audio/video side. In this system, not only can separate and distinct components within computer system 10 be powered down, but the computer system itself can be powered down while preserving power to peripheral components such as the video path or the audio path. In this way, the computer system can serve as either a TV monitor or a CD player at the desire of the user. It does not have to function as a "computer system" in order to provide the TV tuning capability or the audio output capability.

To complement the ability to physically disengage the various components from power, a method for preserving their current status at the time of powering down is also provided. This allows the system to preserve in memory the status of the component at the time it was powered down so that when the component is powered up at a subsequent time, it can resume as if it had not been powered down originally. This method is the subject of U.S. patent application Ser. No. 08/829,437, entitled "POWER MANAGEMENT SCHEMES FOR APPARATUS WITH CONVERGED FUNCTIONALITIES," filed on Mar. 28, 1997, incorporated herein by reference for all purposes.

Further, the graphics portion is separated from the video portion. This is done by a partitioning along the lines of the power planes for video decoder 58. Additionally, since the devices will be turned off, it is undesirable to drive them with any other signal. If an input to an unpowered component is driven, the component will be damaged so all inputs to an unpowered component must be switched to prevent driving an input to the unpowered device. If an output is needed from an unpowered component, the output must be switched through a tri-state buffer whose output must be tied high or low to be passively driven while the component is unpowered (at which time the switch is placed into tri-state buffer mode) in order to prevent the output line from floating.

In order to isolate the components from excess noise, each component is placed on a different power rail, thus a plurality of power rails are provided, meaning one for the digital portion of video/graphics board 30, one for the analog video portion of video/graphics controller 30 and audio/tuner board 40, one for the analog graphics portion of video/graphics board 30, one for the analog audio portion of audio/tuner board 40, one for the digital portion of audio/tuner 40, and different power rails for various other components within computer system 10. Further, critical components on each of these power rails used additional isolation in the form of ferrite beads and/or inductors to isolate them from excess noise.

Although the present embodiment has been depicted in a desktop computer system, it would be advantageous to use such a power management system within a laptop or portable computer system that has limited power source through a battery. Additionally, this particular power management arrangement can also be used in other appliances outside the computer field where selected components within an appliance are desired to be on while others are desired to be off while preserving the status of the off components for when they are powered back up.

The foregoing disclosure and description of the invention are illustrative and explanatory thereof, and various changes in the size, shape, materials, components, circuit elements, wiring connections and contacts, as well as the details of the illustrated design and construction and method of operation may be made without departing from the spirit of the invention.

What is claimed:

1. A computer system comprising: a data processing unit; data input means, connected to said data processing unit; data output display, coupled to said data processing unit; an audio signal processing subsystem, having a plurality of integrated circuit devices including an analog signal processor device, coupled to said data processing unit; and a power management circuit coupled to said data processing unit, said power management circuit further comprising: a plurality of sources of power supply voltages, each power supply voltage associated with at least one of said plurality of integrated circuit devices; a plurality of ground planes, selectively associated with different ones of said plurality of said power supply voltages; and a selector circuit, coupled to said plurality of power and said plurality of ground planes, for selectively deactivating at least one of said plurality of power supply voltages associated with said integrated circuit devices of said audio signal processing subsystem independently of other ones of said plurality of power supply voltages.

2. The apparatus according to claim 1 wherein said audio signal processing unit also includes digital signal processing devices coupled to power supplies and ground planes independently of said analog signal processor integrated circuit devices.

3. The apparatus according to claim 2 wherein a at least one said integrated circuit analog signal processor devices has a different power supply voltage requirement than said integrated circuit digital signal processing devices.

4. The apparatus according to claim 1 wherein said power management circuit includes a switch for controlling a power supply voltage to said audio subsystem independently of operation of said data processing unit.

5. A computer system having a data processing system including a data processor device, a data input device, a data storage device, a video display device, and a system level power supply operably connectable to said data processing system;

said computer system further including analog signal processing circuitry and digital signal processing circuitry having at least one input connectable to receive input signals from one or more signal sources separate from said data processing system;

said analog signal processing circuitry including at least a first analog signal processor connected to an individual power supply voltage and to a first analog signal ground plane;

said digital signal processing circuitry including at least a first digital signal processor connected to an individual power supply voltage and to a second digital signal ground plane; an impedance directly connected between said first and second ground planes; and switch circuitry coupled to switch power to connect said individual power voltages for operation of said analog signal processing circuitry and said digital signal processing circuitry independently of operation of said power supply to said data processing system.

6. A computer system according to claim 5, wherein said impedance is a d.c. isolation impedance.

7. A computer system according to claim 5, wherein said switch circuitry is operable to switch different voltages to said individual power supplies.

8. A computer system according to claim 7, wherein said switch circuitry comprises two commonly operable switch devices receiving different supply voltages.

9. A computer system according to claim 5, wherein said individual power voltages are provided by voltage regulators having different output voltages.

10. A computer system having a data processing system including a data processor device, a data input device, a data storage device, a video display device, and a system level power supply operably connectable to said data processing system;

said computer system further including a video signal processor having at least one input connectable to receive video input signals from one or more video signal sources separate from said data processing system; said video signal processing circuitry including analog video input signal processing circuitry coupled to digital video signal processing output circuitry; said digital video signal processing circuitry coupled to said video display device;

first supply voltage circuitry coupled to provide at least one supply voltage to said analog video input signal processing circuitry, and an analog ground plane connected to said analog circuitry;

second supply voltage circuitry coupled to supply at least one supply voltage to said digital video signal processing output circuitry, and a digital ground plane connected to said digital circuitry;

at least one impedance directly connecting said analog and digital ground planes;

and switching circuitry operable to connect power to and disconnect power from said first and second supply voltage circuitry independently of operation of said data processing system.

11. A computer system according to claim 10, wherein said digital video signal processing output circuitry includes a plurality of subcircuits and wherein second supply voltage circuitry comprises at least two voltage regulator circuits to supply different supply voltages to selected ones of said subcircuits.

12. A computer system according to claim 10, including a chassis ground plane, and an impedance directly connecting said digital ground plane to said chassis ground plane.

13. A computer system according to claim 12, wherein said impedance is a d.c. isolation impedance.

14. A computer system according to claim 12, wherein said system level power supply has an earth ground connected to said chassis ground.

15. A computer system according to claim 10, wherein said video signal processor includes a digital comb filter having a ground plane connected by respective impedances to said analog ground plane and to said digital ground plane.

16. A computer system having a data processing system including a data processor device, a data input device, a data storage device, a video display device, and a system level power supply operably connectable to said data processing system;

said computer system also including a video signal processor having at least one input connectable to receive video input signals from one or more video signal sources separate from said data processing system; said video signal processing circuitry including analog video input signal processing circuitry coupled to digital signal processing output circuitry;

said computer system further including an audio signal processor having at least one input connectable to receive audio input signals from one or more audio signal sources separate from said data processing system; said audio signal processing circuitry including analog audio input signal processing circuitry coupled to digital signal processing output circuitry;

a plurality of first supply voltage regulators coupled to provide separate supply voltages to said analog video input signal processing circuitry and to said analog audio input signal processing circuitry, and separate analog ground planes connected to said analog video input signal processing circuitry and to said analog audio input signal processing circuitry;

a plurality of second supply voltage regulators coupled to supply separate supply voltages to said digital signal processing output circuitry of said video signal processor and said audio signal processor, and at least one digital ground plane connected to said digital signal processing circuitry; and impedances providing respective direct connections between said analog and digital ground planes.

17. A computer system according to claim 16, including switching circuitry operable to connect power to and disconnect power from said first supply voltage circuits and said second supply voltage circuits independently of operation of said data processing system.

18. A computer system according to claim 17, wherein said switching circuitry is connected to provide voltages from different voltage level sources.

19. A computer system according to claim 18, wherein said switch circuitry comprises two commonly operable switch devices receiving different supply voltages.

20. A computer system according to claim 16, including a chassis ground plane, and an impedance connecting said digital ground plane to said chassis ground plane.

21. A computer system according to claim 20, wherein said impedance is a d.c. isolation impedance.

22. A computer system according to claim 20, wherein said system level power supply has an earth ground connected to said chassis ground.

23. A computer system according to claim 16, wherein said video signal processor includes a digital comb filter having a ground plane connected by respective impedances to said analog ground plane and to said second digital ground plane.

24. A computer system comprising: a data processing unit; data input means, connected to said data processing unit; a data output display, coupled to said data processing unit; a signal processing subsystem, having a plurality of integrated circuit devices including an analog signal processor device and an analog signal processor device; and a power management circuit comprising: a source of power supply voltage associated with said data processing unit, a separate source of power supply voltage associated with said analog signal processor, and a separate source of power supply voltage associated with said digital signal processor device; a first ground plane providing an associated with said power management circuit; a second ground plane providing a grounding path for said analog signal processor device, a third ground plane providing a grounding path for said digital signal processor device; an impedance connected between said second and third ground planes to partition the grounding path of said analog signal processor device from the grounding path of said digital signal processor device; and d.c. isolating impedances between said second and third ground planes, respectively, and said first ground plane; and a selector circuit, coupled to said separate sources of power supply voltage and said ground planes and operable to selectively deactivate power supply voltage to said signal processing subsystem independently of operation of said data processing unit.

25. A computer subsystem according to claim 24, wherein said signal processing subsystem comprises an audio signal processor subsystem.

26. A computer system according to claim 24, wherein said signal processing subsystem comprises a video signal processor subsystem.

27. A computer system having a data processing system including a data processor device, a data input device, a data storage device, a video display device, and a system level power supply operably connectable to said data processing system, said system level power supply having an associated ground;

said computer system also including a video signal processor having at least one input connectable to receive video input signals from one or more video signal sources separate from said data processing system; said video signal processing circuitry including analog video input signal processing circuitry coupled to digital signal processing output circuitry;

said computer system further including an audio signal processor having at least one input connectable to receive audio input signals from one or more audio signal sources separate from said data processing system; said audio signal processing circuitry including analog audio input signal processing circuitry coupled to digital signal processing output circuitry;

a plurality of first supply voltage regulators coupled to provide separate supply voltages to said analog video input signal processing circuitry and to said analog audio input signal processing circuitry, and at least one analog ground plane connected to said analog video input signal processing circuitry and to said analog audio input signal processing circuitry;

a plurality of second supply voltage regulators coupled to supply separate regulated supply voltages to each of said digital signal processing output circuitry of said video signal processor and said audio signal processor, and at least one digital ground plane connected to said digital signal processing circuitry; and d.c and a.c. impedances respectively connected between said analog and digital ground planes to partition power supply voltages to said analog signal processing circuitry of said audio signal processor and said video signal processor from power supply voltages to said digital signal processing output circuitry of said video signal processor and said audio signal processor; and switching circuitry operable to connect power to and disconnect power from said first and second supply voltage supply voltage regulators independently of operation of said data processing system by said system level power supply.

* * * * *